United States Patent [19]

Meng

[11] Patent Number: 5,551,230
[45] Date of Patent: Sep. 3, 1996

[54] HEAT INDUCED HIGH PRESSURE LOX PUMP ROCKET ENGINE CYCLE

[75] Inventor: Sen Y. Meng, Reseda, Calif.

[73] Assignee: Rockwell International Corporation, Seal Beach, Calif.

[21] Appl. No.: 209,282

[22] Filed: Mar. 14, 1994

[51] Int. Cl.⁶ ........................... F02K 9/00
[52] U.S. Cl. ................... 60/259; 160/39.461
[58] Field of Search .............. 60/39.141, 39.142, 60/39.461, 39.48, 258, 259, 260

[56] References Cited

U.S. PATENT DOCUMENTS

| | | | |
|---|---|---|---|
| 2,612,752 | 10/1952 | Goddard | 60/39.461 |
| 2,704,438 | 3/1955 | Sheets | 60/259 |
| 3,300,981 | 1/1967 | Webb | 60/39.48 |
| 3,379,011 | 4/1968 | Von Chain et al. | 60/259 |
| 3,672,165 | 6/1972 | Baum | 60/39.48 |
| 4,771,599 | 9/1988 | Brown et al. | 60/258 |

*Primary Examiner*—Timothy S. Thorpe
*Attorney, Agent, or Firm*—George A. Montanye; Harry B. Field; Steven E. Kahm

[57] ABSTRACT

A liquid hydrogen-liquid oxygen ($LH_2$-LOX) rocket engine system wherein a conventional oxidizer turbo pump is replaced with a jet pump—a jet oxidizer pump. Beneficial features of the jet oxidizer pump system, over a conventional oxidizer turbo pump system, include: 1) it does not require a complicated seal system, 2) it has no moving parts, and 3) it is lighter. All these features improve the operational reliability of the rocket engine while decreasing its manufacturing cost.

3 Claims, 3 Drawing Sheets

HEAT INDUCED HIGH PRESSURE LOX PUMP ROCKET ENGINE CYCLE

1. BACKGROUND OF THE INVENTION
   1.1 Conventional Oxidizer Turbo Pump
2. SUMMARY OF THE INVENTION
3. BRIEF DESCRIPTION OF THE DRAWINGS
4. DETAILED DESCRIPTION OF SPECIFIC EMBODIMENT
   4.1 Single Jet Pump Embodiment
   4.2 Dual Jet Pump Embodiment
   4.3 Conclusion
5. CLAIMS
ABSTRACT

1. BACKGROUND OF THE INVENTION

A conventional liquid oxygen (LOX), liquid hydrogen (LH$_2$) rocket engine is shown in FIG. 1. Liquid hydrogen is the engine's fuel and liquid oxygen the engine's oxidizing agent. In a conventional rocket engine, the fuel and oxidizer's standing head, from reservoirs or tanks 140 and 145, provide the motive force which allows the LH$_2$ and LOX to flow through the fuel turbo pump 100 and oxidizer turbo pump 105 and into a gas generator 110. Once LH$_2$ and LOX mix in the gas generator 110, they combust providing further motive force to spin-up the fuel and oxidizer turbo pumps, 100 and 105.

Once this (boot-strap) process is begun, the fuel turbo pump 100 provides liquid hydrogen through adjustable valve 115, orifice 120 and mixer 125 to the combustion chamber 130. Similarly, the oxidizer turbo pump 105 provides liquid oxygen through orifice 120 and adjustable valve 115 to the combustion chamber 130. Within the combustion chamber, LH$_2$ and LOX combust creating an exhaust gas which flows into the thrust chamber 135 and out the jet nozzle.

In addition to being used as fuel, a small fraction of the LH$_2$ is used to cool the exterior of the combustion and thrust chambers, 130 and 135 respectively, and as a result is heated. Liquid hydrogen, heated in this process, is routed to mixer 125 where it is combined with cooler LH$_2$ (i.e., that portion of liquid hydrogen not used for cooling) before it is fed into the combustion chamber 130. The purpose of the mixer 125 is to "homogenize" the temperature of the LH$_2$ fed into the combustion chamber 130.

Orifices 120 provide coarse control of LH$_2$ and LOX flow through the rocket engine. Adjustable valves 115 provide fine control of LH$_2$ and LOX flow through the rocket engine.

1.1 Conventional Oxidizer Turbo Pump

The gas generator 110, which provides the primary motive energy to drive both the fuel and oxidizer turbo pumps, produces a hydrogen rich exhaust gas. This, in turn, requires the oxidizer turbo pump 105 to have a highly reliable seal system between the oxidizer turbo pump's drive stage (e.g., that part of the pump receiving energy from the gas generator 110; the pump end) and its turbine stage (e.g., that part of the pump receiving LOX from a LOX fuel tank 145; the turbine end). Should the seal system fail, LH$_2$ and LOX could mix in the oxidizer turbo pump possibly causing a catastrophic explosion. Because of this possibility, the oxidizer turbo pump's seal system is complicated, expensive and, as a result, unreliable (i.e., its mean time between failure is smaller than other critical components in the engine system).

Fuel turbo pump 100, on the other hand, does not require such a highly reliable or complicated seal system because the gas generator's hydrogen rich exhaust is compatible with the LH$_2$ pumped fluid, a possibly explosive condition does not exist. Thus, the fuel turbo pump can use standard turbine seals and is, therefore, a more reliable device.

Another characteristic of the oxidizer turbo pump used in conventional rocket engines concerns its output power. Liquid hydrogen has a density of roughly 70 kg/m$^3$ (4.4 pounds per cubic foot) while liquid oxygen has a density of roughly 1121 kg/m$^3$ (70 pounds per cubic foot), a density mismatch is close to 20:1. Thus, for a specified discharge pressure the fuel turbo pump needs to be approximately twenty times more powerful than the oxidizer turbo pump. That is, to achieve a given pressure at the combustion chamber's input, the fuel turbo pump needs to be a more powerful pump. Thus, it is possible to use a less efficient oxidizer pump and still generate the high output pressure required at the combustion chamber input.

2. SUMMARY OF THE INVENTION

In accordance with the invention, a conventional oxidizer turbo pump in a liquid hydrogen-liquid oxygen rocket engine system is replaced with a jet pump. Beneficial features of the jet oxidizer pump system include: 1) it does not require a complicated seal system, 2) it has no moving parts, and 3) it is lighter. All these features improve the operational reliability of the rocket engine while decreasing the manufacturing cost of the rocket engine.

3. BRIEF DESCRIPTION OF THE DRAWINGS

4. DETAILED DESCRIPTION OF SPECIFIC EMBODIMENT

Two illustrative embodiments of the invention are described below as they might be applied to National Aeronautics and Space Administration's (NASA's) Space Shuttle Main Engine (SSME) system. In the interest of clarity, not all features of an actual design are described in this specification. It will of course be appreciated that in the design of any such actual implementation (as in any hardware development project), numerous implementation-specific decisions must be made to achieve the engineers' specific goals and subgoals. Moreover, it will be appreciated that such a design effort might be complex and time-consuming, but would nevertheless be a routine undertaking of mechanical design engineering for those of ordinary skill having the benefit of this disclosure.

4.1 Single Jet Pump Embodiment

In a conventional rocket engine system, liquid hydrogen (LH$_2$) fuel and liquid oxygen (LOX) oxidizer are stored at close to their vapor pressure. This allows the fuel and oxidizer storage tanks or reservoirs, 140 and 145, to be built of lighter materials than would otherwise be possible. This, in turn, can reduce the weight of the rocket engine system, making it a more efficient and economical payload lift vehicle. For instance, $LH_2$ is typically stored in fuel tanks at a pressure between 0.21 and 0.28 MPa (30 and 40 psi), LOX is generally stored at a pressure between 0.34 to 0.41 MPa (50 to 60 psi). Because of these low pressures, both the fuel turbo pump 100 and oxidizer turbo pump 105 often have a booster pump before their main stages. The purpose of these booster pumps is to provide an increase net positive head at the inlet of the main (fuel or oxidizer) pumps.

Figure 1:
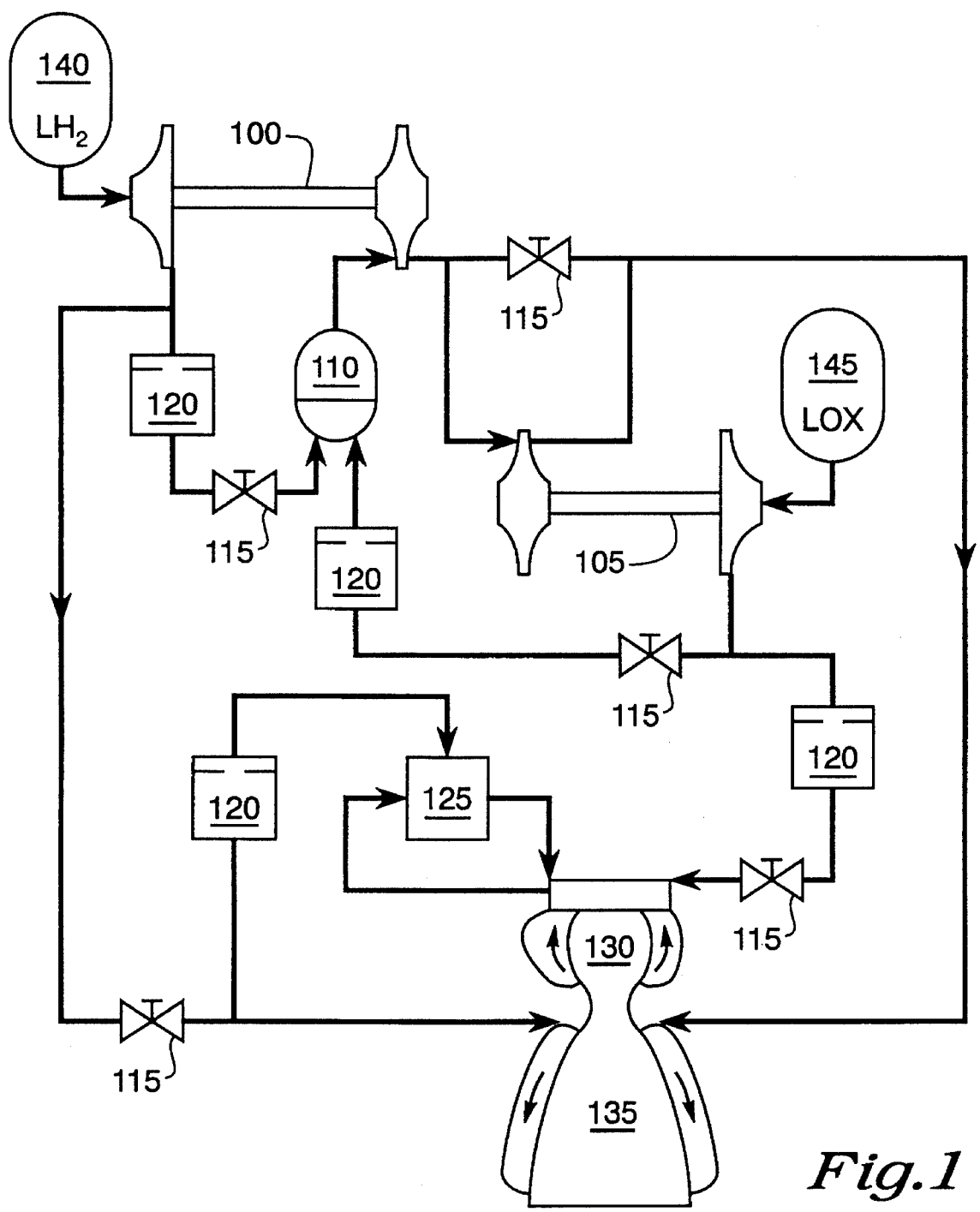
FIG. 1 is a block diagram representation of a conventional liquid hydrogen-liquid oxygen rocket engine.
Figure 2:
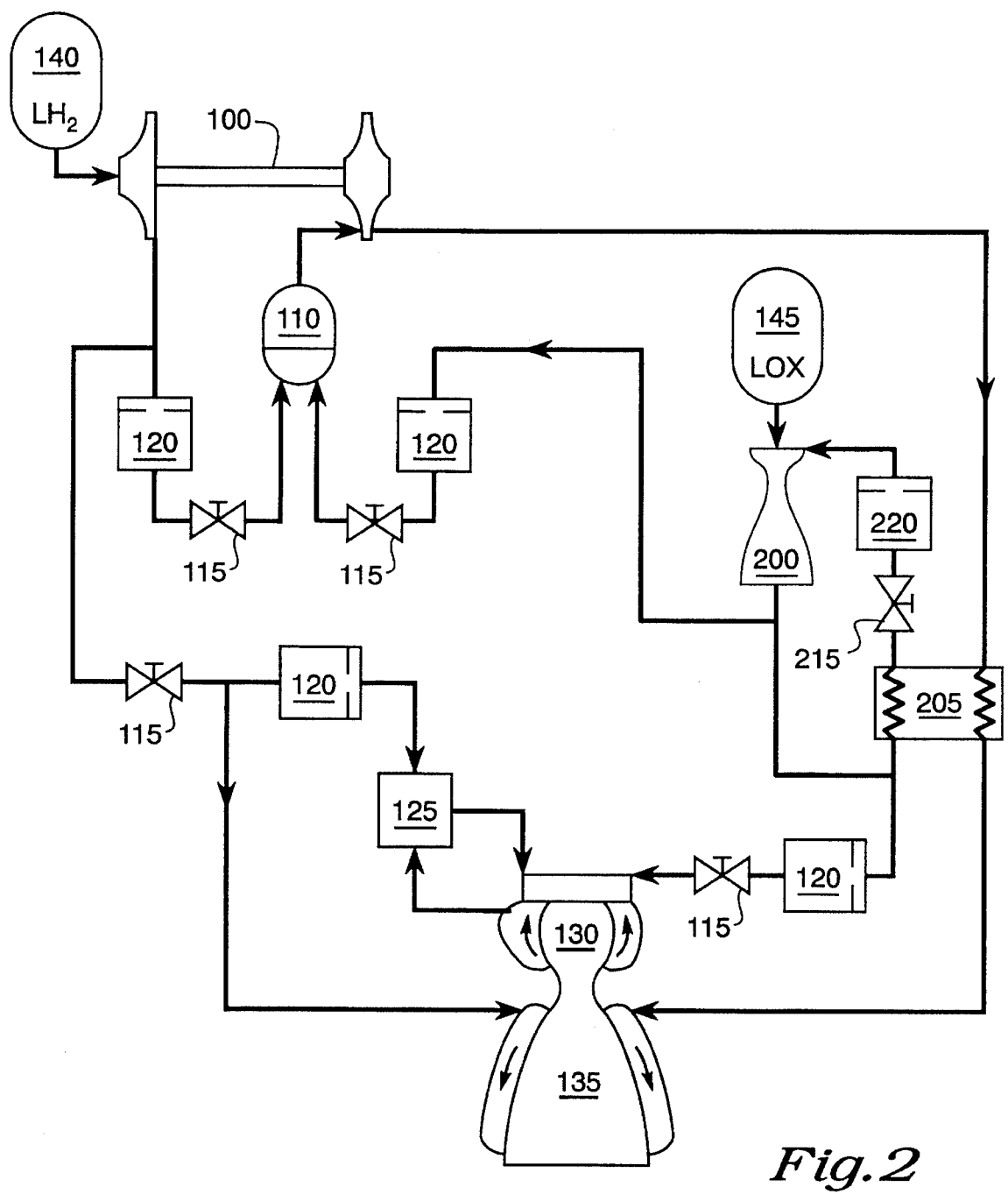
FIG. 2 is a block diagram of one embodiment of the invention wherein the oxidizer turbo pump of FIG. 1 is replaced by a jet pump and heat exchanger.

In one embodiment of the invention, the oxidizer turbo pump 105 is replaced by a jet pump 200 and a heat exchanger 205 as shown in FIG. 2, with no booster pump. The function of the jet pump/heat exchanger system is identical to the oxidizer turbo pump 105. The heat exchanger 205 is used to convert some of the jet pump's LOX output into gaseous oxygen (GOX) to further drive the jet pump. In other aspects, the system of FIG. 2 is largely identical functionally to that of FIG. 1.

In a conventional $LH_2$-LOX rocket engine, such as the SSME, the hydrogen rich exhaust gas from gas generator 110 is substantially hotter than the jet oxidizer pump's LOX output. This ensures the heat exchanger 205 converts some of the jet oxidizer pump's LOX output to GOX. This GOX is used to prime the jet oxidizer pump's input and is mixed with the jet pump's incoming LOX stream. The amount of LOX fed back through heat exchanger 205 is controlled by adjustable valve 215 and orifice 220. It is through these two elements, 215 and 220, that the jet oxidizer pump output is controlled.

4.2 Dual Jet Pump Embodiment

One drawback to the embodiment of FIG. 2 results from the relative inefficiency of a jet pump as compared to an oxidizer turbo pump. A typical oxidizer turbo pump 105 operates at an efficiency around 55% while a jet pump 200 typically operates at efficiencies between 22% and 35%. To compensate for this lower efficiency, the temperature of the LOX input to the jet oxidizer pump 200 (supplied from the LOX fuel tank or reservoir 145) should be 33–42K lower than that required by a rocket engine utilizing a conventional oxidizer turbo pump. In a conventional $LH_2$-LOX rocket engine, the $LH_2$ is stored at approximately 21K and LOX at 91K.

For the reasons cited above, in the embodiment of FIG. 2 the LOX is preferably subcooled. Subcooling could increase the cost of the resulting rocket engine (e.g., more, or more complex, cooling elements for the LOX). An alternative embodiment of the invention, shown in FIG. 3, does not entail cooling the LOX below conventional operating temperatures.

Figure 3:
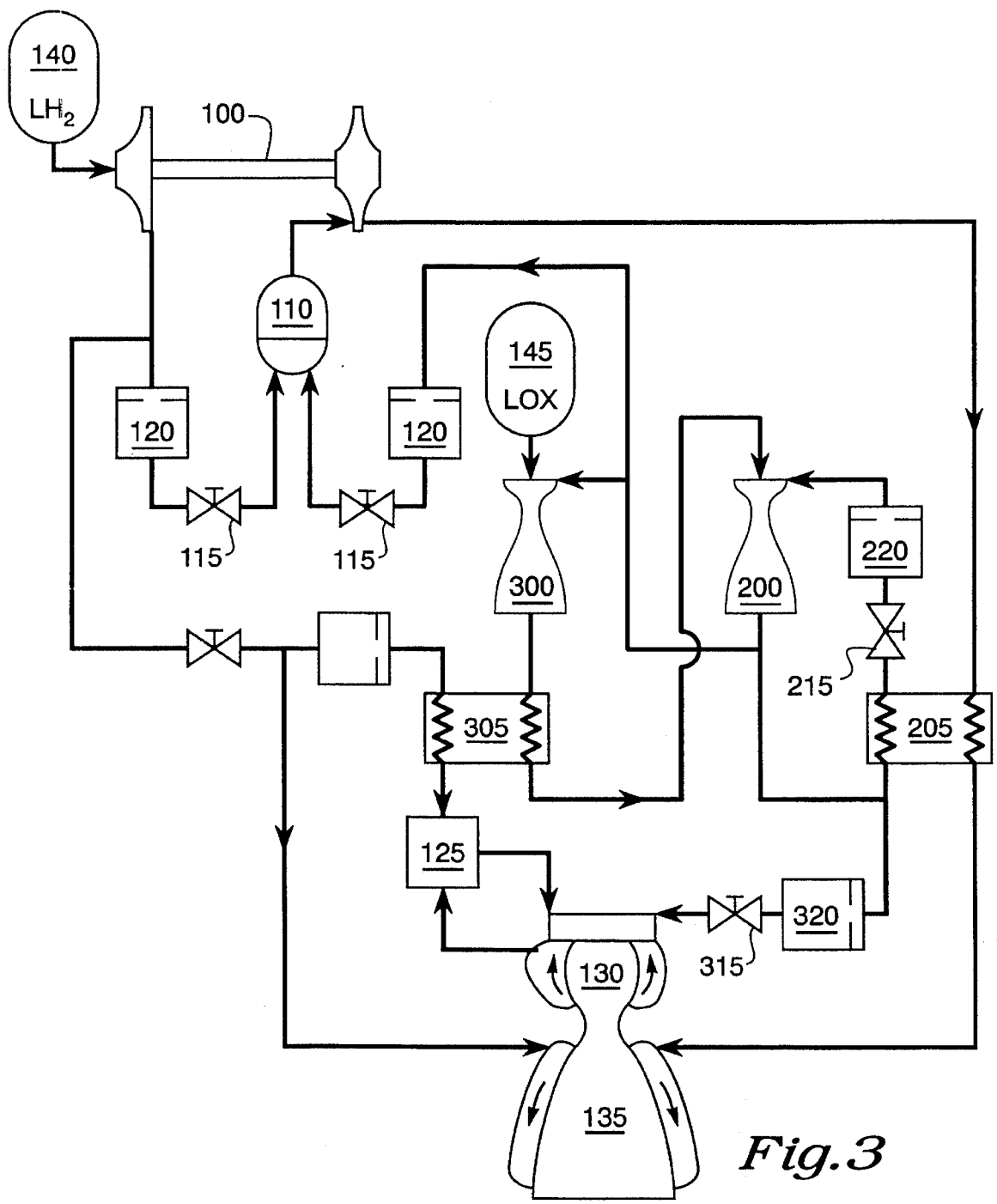
FIG. 3 is a block diagram of an alternative embodiment of the invention wherein the jet oxidizer pump of FIG. 2 is primed by a second jet pump and heat exchanger.

In a dual jet pump embodiment, shown in FIG. 3, the normal temperature difference between $LH_2$ fuel (at 21K) and LOX oxidizer (at 91K) is used to advantage. Specifically, some of the fuel turbo pump's 100 discharge is used to precool the jet oxidizer pump's 200 LOX input via heat exchanger 305. Jet pump 400 is used to overcome the loss of pressure introduced by the heat exchanger 405. (Note, if heat exchanger 305 can be designed such that its pressure drop is sufficiently low, jet pump 300 can be eliminated from the system.)

In a conventional rocket engine with $LH_2$ stored at 21K and LOX stored at 91 K, $LH_2$ at the discharge of fuel turbo pump 100 is typically about 40K. When fed through heat exchanger 305 this precools the LOX (at approximately 91K) passing through the heat exchanger 405 on its way to the main jet oxidizer pump 200. In this way, the $LH_2$-LOX fuel tank can be kept at standard operating temperatures (i.e., approximately 90K).

In the dual jet pump configuration, jet oxidizer pump 200 is called a feed pump because it "feeds" LOX to the main combustion chamber 130 and its associated heat exchanger 205 is called the feed pump heat exchanger. Jet pump 300 is called a booster pump because it "boosts" the pressure of the LOX routed to jet oxidizer pump 200, and its associated heat exchanger 305 is called a booster pump heat exchanger.

4.3 Conclusion

The invention describes two embodiments of a $LH_2$-LOX rocket engine system that uses jet pumps in place of a standard oxidizer turbo pump. In a first embodiment, a jet oxidizer pump and associated heat exchanger replace a single oxidizer turbo pump. The benefits of this design are the improved reliability and lower weight of the rocket engine system. In a second embodiment, an additional jet pump and associated heat exchanger, are used to increase the LOX head to the main jet oxidizer pump. This second embodiment can provide roughly the same efficiency as a conventional rocket engine employing LOX oxidizer turbo pumps while providing improved reliability (jet pumps have no moving parts and do not require complex seal systems) and lower weight.

Tables 1 through 3 summarize some possible operational characteristics that might exist for a conventional rocket engine oxidizer turbo pump (Table 1) and a rocket engine employing the two enhancements disclosed herein (Tables 2 and 3).

TABLE 1

| Conventional Rocket Engine (FIG. 1) | | |
| --- | --- | --- |
| | $LH_2$ Pump | LOX Pump |
| Inlet Temperature [K] | 21 | 91 |
| Inlet Pressure [kPa] | 220 | 324 |
| Outlet Temperature [K] | 41 | 100 |
| Outlet Pressure [MPa] | 25.7 | 23.8 |

TABLE 2

| Single Jet Pump Rocket Engine (FIG. 2) | | |
| --- | --- | --- |
| | $LH_2$ Pump | LOX Pump |
| Inlet Temperature [K] | 21 | 56 |
| Inlet Pressure [kPa] | 220 | 324 |
| Outlet Temperature [K] | 41 | 100 |
| Outlet Pressure [MPa] | 25.7 | 23.8 |

TABLE 3

| Dual Jet Pump Rocket Engine (FIG. 3) | | |
| --- | --- | --- |
| | $LH_2$ Pump | LOX Pump |
| Inlet Temperature [K] | 21 | 56 |
| Inlet Pressure [kPa] | 220 | 324 |
| Outlet Temperature [K] | 41 | 118 |
| Outlet Pressure [MPa] | 25.7 | 23.8 |

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

5. CLAIMS

What is claimed is:

1. A rocket engine liquid oxygen (LOX) pump system comprising:
   (a) a LOX reservoir;
   (b) a heat exchanger having:
      (1) a hydrogen inlet communicating with a source of hydrogen that is warmer than said LOX reservoir;
      (2) a hydrogen outlet;
      (3) a LOX inlet; and
      (4) a LOX outlet;
   (c) an eductor pump having:
      (1) a LOX inlet communicating with said LOX reservoir;
      (2) a priming fluid inlet in fluid communication with said heat exchanger LOX outlet, and
      (3) a discharge;
   (d) said heat exchange LOX inlet being in fluid communication with said eductor pump discharge.

2. A rocket engine two-stage liquid oxygen (LOX) pump system comprising:
   (a) a LOX reservoir;
   (b) a feed-pump heat exchanger, referred to as FPHX, having:
      (1) a hydrogen inlet communicating with a source of hydrogen that is warmer than said LOX reservoir;
      (2) a hydrogen outlet;
      (3) a LOX inlet; and
      (4) a LOX outlet;
   (c) a boost-pump heat exchanger, referred to as BPHX, having:
      (1) a BPHX hydrogen inlet communicating with a source of hydrogen that is cooler than said LOX reservoir;
      (2) a BPHX hydrogen outlet;
      (3) a BPHX LOX inlet; and
      (4) a BPHX LOX outlet
   (c) an eductor feed pump, having:
      (1) a feed-pump LOX inlet communicating with said BPHX LOX outlet;
      (2) a feed-pump priming fluid inlet in fluid communication with said FPHX LOX outlet, and
      (3) a feed-pump discharge;
   (c) an eductor boost pump, referred to as BP, having:
      (1) a LOX inlet communicating with said LOX reservoir;
      (2) a BP priming fluid inlet in fluid communication with said feed-pump discharge, and
      (3) a BP discharge in fluid communication with said BPHX LOX inlet;
   (d) said FPHX LOX inlet being in fluid communication with said eductor feed pump discharge.

3. A rocket engine liquid oxygen (LOX) pump system comprising:
   (a) a LOX reservoir;
   (b) a feed-pump heat exchanger, referred to as FPHX, having:
      (1) a hydrogen inlet communicating with a source of hydrogen that is warmer than said LOX reservoir;
      (2) a hydrogen outlet;
      (3) a LOX inlet; and
      (4) a LOX outlet;
   (c) a pump-inlet precooler heat exchanger, referred to as PIPHX, having:
      (1) a PIPHX hydrogen inlet communicating with a source of hydrogen that is cooler than said LOX reservoir;
      (2) a PIPHX hydrogen outlet;
      (3) a PIPHX LOX inlet in fluid communication with said LOX reservoir; and
      (4) a PIPHX LOX outlet;
   (d) an eductor feed pump having:
      (1) a feed-pump LOX inlet communicating with said PIPHX LOX outlet;
      (2) a priming fluid inlet in fluid communication with said FPHX LOX outlet, and
      (3) a discharge.

* * * * *